United States Patent
Feng

(10) Patent No.: US 11,399,378 B2
(45) Date of Patent: Jul. 26, 2022

(54) METHOD AND TERMINAL FOR DATA TRANSMISSION USING UNLICENSED CARRIER

(71) Applicant: GUANGDONG OPPO MOBILE TELECOMMUNICATIONS CORP., LTD., Guangdong (CN)

(72) Inventor: Bin Feng, Dongguan (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 25 days.

(21) Appl. No.: 15/740,302

(22) PCT Filed: Nov. 20, 2015

(86) PCT No.: PCT/CN2015/095186
§ 371 (c)(1),
(2) Date: Dec. 27, 2017

(87) PCT Pub. No.: WO2017/084095
PCT Pub. Date: May 26, 2017

(65) Prior Publication Data
US 2018/0192430 A1      Jul. 5, 2018

(51) Int. Cl.
*H04W 72/12*      (2009.01)
*H04L 1/18*       (2006.01)
(Continued)

(52) U.S. Cl.
CPC ....... *H04W 72/1215* (2013.01); *H04L 1/1854* (2013.01); *H04W 16/14* (2013.01);
(Continued)

(58) Field of Classification Search
CPC combination set(s) only.
See application file for complete search history.

(56) References Cited

U.S. PATENT DOCUMENTS

| 2013/0188535 A1 | 7/2013 | Seo |
| 2013/0322397 A1* | 12/2013 | Lee .................. H04W 56/0045 370/329 |

(Continued)

FOREIGN PATENT DOCUMENTS

| CN | 101667960 A | 3/2010 |
| CN | 102271407 A | 12/2011 |

(Continued)

OTHER PUBLICATIONS

Supplementary European Search Report in the European application No. 15908591.9, dated Feb. 1, 2019.
(Continued)

*Primary Examiner* — Christopher M Crutchfield
*Assistant Examiner* — Tito Q Pham

(57) ABSTRACT

Disclosed in the present invention are data transmitting method, a terminal and a base station. Provided is as feasible method for transmitting feedback information under the scenario in which a unlicensed carrier works independently, and in which the feedback information corresponding to a plurality of time limits for downlink transmission are transmitted within a time unit for uplink transmission, thereby improving the efficiency of feedback.

19 Claims, 14 Drawing Sheets

(51) Int. Cl.
*H04W 72/04* (2009.01)
*H04W 16/14* (2009.01)
*H04W 28/04* (2009.01)

(52) U.S. Cl.
CPC ... *H04W 72/0406* (2013.01); *H04W 72/1268* (2013.01); *H04L 1/1812* (2013.01); *H04W 28/04* (2013.01)

(56) References Cited

U.S. PATENT DOCUMENTS

| | | | |
|---|---|---|---|
| 2014/0036889 A1 | 2/2014 | Kim | |
| 2014/0098780 A1* | 4/2014 | Kim | H04L 5/0055 370/329 |
| 2014/0161002 A1* | 6/2014 | Gauvreau | H04L 1/1893 370/280 |
| 2014/0185496 A1* | 7/2014 | Wolf | H04W 92/20 370/294 |
| 2015/0023185 A1* | 1/2015 | Bodas | H04W 72/0446 370/252 |
| 2015/0049708 A1 | 2/2015 | Damnjanovic et al. | |
| 2015/0055519 A1* | 2/2015 | Lin | H04L 1/1607 370/280 |
| 2015/0055589 A1* | 2/2015 | Yerramalli | H04L 5/0053 370/329 |
| 2015/0195056 A1 | 7/2015 | He et al. | |
| 2016/0020891 A1* | 1/2016 | Jung | H04W 72/1278 370/280 |
| 2016/0057741 A1 | 2/2016 | Seo et al. | |
| 2016/0165579 A1* | 6/2016 | You | H04W 76/00 370/280 |
| 2016/0212734 A1* | 7/2016 | He | H04L 5/14 |
| 2016/0226637 A1* | 8/2016 | Nory | H04L 5/0053 |
| 2016/0227523 A1* | 8/2016 | Desai | H04L 5/001 |
| 2016/0338110 A1* | 11/2016 | Wang | H04W 74/0833 |
| 2017/0086174 A1* | 3/2017 | Zhang | H04W 72/04 |
| 2018/0013522 A1* | 1/2018 | Liu | H04L 1/1854 |
| 2018/0026742 A1* | 1/2018 | Mirzaee | H04L 1/1822 370/329 |
| 2018/0062796 A1* | 3/2018 | Feng | H04L 1/1812 |
| 2018/0262377 A1* | 9/2018 | Liu | H04L 27/2602 |
| 2018/0351707 A1* | 12/2018 | Wang | H04L 1/1887 |

FOREIGN PATENT DOCUMENTS

| | | |
|---|---|---|
| CN | 102281639 A | 12/2011 |
| CN | 103220786 A | 7/2013 |
| CN | 103460740 A | 12/2013 |
| CN | 104144457 A | 11/2014 |
| CN | 104683076 A | 6/2015 |
| CN | 104936189 A | 9/2015 |
| JP | 2011511596 A | 4/2011 |
| JP | 2013540394 A | 10/2013 |
| JP | 2014508468 A | 4/2014 |
| JP | 2016503611 A | 2/2016 |
| JP | 2016519885 A | 7/2016 |
| JP | 2016535959 A | 11/2016 |
| JP | 2017500793 A | 1/2017 |
| WO | 2013107379 A1 | 7/2013 |
| WO | 2014077577 A1 | 5/2014 |
| WO | 2014163415 A1 | 10/2014 |
| WO | 2015027139 A2 | 2/2015 |
| WO | 2015103579 A1 | 7/2015 |

OTHER PUBLICATIONS

English Translation of the Written Opinion of the International Search Authority in the international application No. PCT/CN2015/095186, dated Aug. 12, 2016.
International Search Report in international application No. PCT/CN2015/095186, dated Aug. 12, 2016.
The Written Opinion of the International Search Authority in international application No. PCT/CN2015/095186, dated Aug. 12, 2016.
First Office Action of the Indian application No. 201817005049, dated Mar. 12, 2020.
First Office Action of the Chinese application No. 201580081377.7, dated Apr. 2, 2020.
Notice of Rejection of the Japanese application No. 2019-155926, dated Dec. 15, 2020.
Ericsson, Huawei, Qualcomm, Alcatel-Lucent; "New Work Item on Licensed-Assisted Access to Unlicensed Spectrum", 3GPP TSG RAN Meeting #68, RP-151045, Malmö, Sweden, Jun. 15-18, 2015.
Second Office Action of the Chinese application No. 201580081377.7, dated Aug. 18, 2020.
First Office Action of the Japanese application No. 2019-155926, dated Aug. 28, 2020.
First Office Action of the Japanese application No. 2018-500671, dated Apr. 19, 2019.
First Office Action of the European application No. 15908591.9, dated Jan. 23, 2020.
Second Office Action of the European application No. 15908591.9, dated Mar. 30, 2021.
First Office Action of the Korean application No. 10-2018-7001831, dated Mar. 11, 2022.
First Office Action of the Japanese application No. 2021-068200, dated May 24, 2022.

* cited by examiner

METHOD AND TERMINAL FOR DATA TRANSMISSION USING UNLICENSED CARRIER

RELATED APPLICATION

This application is an application under 35 U.S.C. 371 of International Application No. PCT/CN2015/095186 filed on Nov. 20, 2015, the entire contents of which are incorporated herein by reference.

TECHNICAL FIELD

Embodiments of the disclosure relate to the field of communications, and particularly to a data transmission method, a terminal and a base station.

BACKGROUND

On one hand, a Physical Downlink Share Channel (PDSCH) in a Long Term Evolution (LTE) system supports a Hybrid Automatic Repeat Request (HARQ) function. After establishing a communication connection with a base station, a terminal receives Downlink Control Information (DCI) and acquires scheduling information (which may include, for example, contents of locations and number of physical resources, a modulation and coding level and the like) corresponding to the PDSCH. The terminal receives the PDSCH according to the scheduling information, and demodulates and decodes a Transport Block (TB) born the PDSCH. If a decoding result is correct, the terminal may feed back Acknowledgement (ACK) information to the base station. If the decoding result is incorrect, the terminal may feed back Negative Acknowledgement (NACK) information to the base station, and then the base station retransmits the TB.

The ACK information or the NACK information may be transmitted through a Physical Uplink Share Channel (PDSCH) or a Physical Uplink Control Channel (PUCCH).

On the other hand, the LTE system may use a Carrier Aggregation (CA) technology to implement bandwidth extension. That is, multiple LTE Component Carriers (CCs) are aggregated to achieve a larger transmission bandwidth. For the CA technology, a conventional art discloses a License Assisted Access (LAA) technology to implement aggregation of a licensed carrier and an unlicensed carrier.

During subsequent improvement, an unlicensed carrier may work independently of a licensed carrier, that is, a terminal may acquire complete system information, implement uplink and downlink synchronization, receive scheduling information, receive downlink data, send uplink data, send necessary feedback information and the like only through the unlicensed carrier. At present, there is yet no definite solution about a specific flow for implementing independent work of an LTE system on an unlicensed carrier, and there is also no solution about how to transmit feedback information.

SUMMARY

The embodiments of the disclosure provide a data transmission method, a terminal and a base station, which may implement transmission of feedback information on an unlicensed carrier.

In a first aspect, there is provided a data transmission method, which may include that:

a terminal determines M time units in an unlicensed carrier which are configured for uplink transmission and N time units in the unlicensed carrier which are configured for downlink transmission, wherein M may be a positive integer, and N may be a positive integer;

the terminal receives downlink data sent by a base station over the N time units; and the terminal sends feedback information, which is corresponding to the downlink data in the first K time units of the N time units, to the base station over a first time unit of the M time units, wherein K may be a positive integer less than or equal to N, the first time unit may be after the first K time units, and a difference value between a starting moment of the first time unit and a starting moment of the last time unit of the first K time units may be equal to or greater than a system feedback processing latency.

In a possible implementation of the first aspect, the method may further include that:

the terminal receives indication information at a starting moment of the N time units, the indication information being configured to indicate the N time units which are configured for downlink transmission and the M time units which are configured for uplink transmission.

In a possible implementation of the first aspect, the operation that the terminal sends the feedback information, which is corresponding to the downlink data in the first K time units of the N time units, over a first time unit of the M time units may include that:

the terminal generates cascaded C×K-bit information as the feedback information according to a sequence of the time units, wherein C may be a maximum codeword number supported by system downlink transmission; and the terminal sends the feedback information to the base station over the first time unit.

In a second aspect, there is provided a data transmission method, which may include that:

a base station determines M time units in an unlicensed carrier which are configured for uplink transmission and N time units in the unlicensed carrier which are configured for downlink transmission, wherein M may be a positive integer, and N may be a positive integer;

the base station sends downlink data to a terminal over the N time units; and the base station receives feedback information, which is corresponding to the downlink data in the first K time units of the N time units, from the terminal over a first time unit of the M time units, wherein K may be a positive integer less than or equal to N, the first time unit may be after the first K time units, and a difference value between a starting moment of the first time unit and a starting moment of the last time unit of the first K time units may be equal to or greater than a system feedback processing latency.

In a possible implementation of the second aspect, the method may further include that:

the base station sends indication information to the terminal at a starting moment of the N time units, the indication information being configured to indicate the N time units which are configured for downlink transmission and the M time units which are configured for uplink transmission.

In a possible implementation of the second aspect, the feedback information may be C×K-bit information cascaded according to a sequence of the time units, wherein C may be a maximum codeword number supported by system downlink transmission.

In a possible implementation of the second aspect, the method may further include that:

the base station sets a Guard Period (GP) for uplink transmission and downlink transmission.

In a third aspect, there is provided a terminal, which may include a determination module, a receiving module and a sending module and be configured to execute the corresponding implementations of the first aspect and the second aspect.

In a fourth aspect, there is provided a terminal, which may include a processor, a receiver, a sender and a memory and be configured to execute the corresponding implementations of the first aspect and the second aspect, and each device of the terminal of the fourth aspect may correspond to a corresponding module of a terminal of the third aspect.

In a fifth aspect, there is provided a base station, which may include a determination module, a sending module and a receiving module and be configured to execute the corresponding implementations of the first aspect and the second aspect.

In a sixth aspect, there is provided a base station, which may include a processor, a receiver, a sender and a memory and be configured to execute the corresponding implementations of the first aspect and the second aspect, and each device of the base station of the sixth aspect may correspond to a corresponding module of a terminal of the fifth aspect.

In the first aspect to the sixth aspect and the corresponding implementations, a possible solution is that the first time unit may be the last time unit of the M time units.

In the first aspect to the sixth aspect and the corresponding implementations, another possible solution is that, when a length of the M time units is equal to or greater than the feedback processing latency, the first time unit may be the first time unit after the feedback processing latency, with the last time unit in the N time units as a reference; and when the length of the M time units is smaller than the feedback processing latency, the first time unit may be the last time unit of the M time units.

Here, the downlink data may include at least one of broadcast information, a synchronization signal, a reference signal, DCI and downlink service data.

Here, the DCI may include scheduling information, and the scheduling information may be configured to scheduling uplink transmission of the M time units.

A possible solution is that the scheduling information sent in each of the cells, which are configured for scheduling uplink transmission, of the N time units may be configured to schedule uplink transmission of one of the M time units.

Another possible solution is that the scheduling information sent in each of the cells, which are configured for scheduling uplink transmission, of the N time units may be configured to schedule uplink transmission of more than one of the M time units.

Preferably, the time units may be subframes or timeslots.

Preferably, the M time units may be successive time units, the N time units may be successive time units, the N time units and the M time units may be successive time units, and the N time units may be before the M time units.

On the basis of the abovementioned technical solutions, according to the data transmission meth, terminal and base station of the embodiments of the disclosure, a feasible method for transmitting feedback information in a scenario where an unlicensed carrier independently works is provided, and moreover, feedback information corresponding to multiple time units configured for downlink transmission is sent via a time unit configured for uplink transmission, so that feedback efficiency may be improved.

BRIEF DESCRIPTION OF DRAWINGS

In order to describe the technical solutions of the embodiments of the disclosure more clearly, the drawings required to be used for descriptions about the embodiments or the conventional art will be simply introduced below. It is apparent that the drawings described below are only some embodiments of the disclosure. For those skilled in the art, other drawings may further be obtained according to these drawings without creative work.

DETAILED DESCRIPTION

Figure 1:
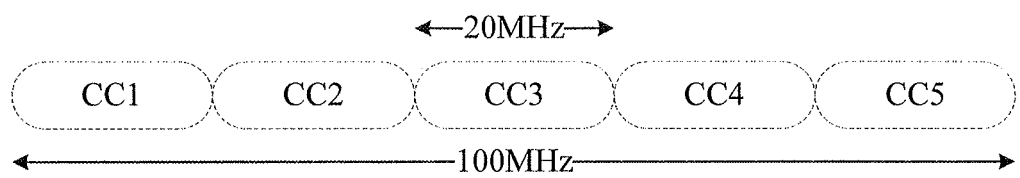
FIG. 1 is a schematic diagram of an LTE CA technology.

The technical solutions in the embodiments of the disclosure will be clearly and completely described below in conjunction with the drawings in the embodiments of the disclosure. It is apparent that the described embodiments are not all embodiments but part of embodiments of the disclosure. All other embodiments obtained by those skilled in the art on the basis of the embodiments in the disclosure without creative work fall within the scope of protection of the disclosure.

Terms "part", "module", "system" and the like used in the specification are adopted to represent an entity, hardware, firmware, combination of hardware and software, software or software in execution related to a computer. For example, a part may be, but is not limited to, a process running on a processor, the processor, an object, an executable file, an execution thread, a program and/or a computer. It is graphically represented that all applications running on computing equipment and the computing equipment may be parts. One or more parts may reside in a process and/or an execution thread, and the parts may be located on a computer and/or distributed between two or more computers. In addition, these parts may be executed from various computer-readable media on which various data structures are stored. The parts may communicate through local and/or remote processes according to, for example, signals with one or more data groups (for example, data from two parts interacting with each other in a local system, a distributed system and/or a network, for example, the Internet interacting with another system through a signal).

It is to be understood that the technical solutions of the embodiments of the disclosure may be applied to various communication systems, for example: a Global System for Mobile Communication (GSM), a Code Division Multiple Access (CDMA) system, a Wideband Code Division Multiple Access (WCDMA) General Packet Radio Service (GPRS) system, an LTE system, an LTE Frequency Division Duplex (FDD) system, LTE Time Division Duplex (TDD), a Universal Mobile Telecommunication System (UMTS), a Worldwide Interoperability for Microwave Access (WiMAX) communication system and a future 5th-Generation (5G) communication system.

Various embodiments are described in the disclosure in conjunction with a terminal. The terminal may communicate with one or more core networks through a Radio Access Network (RAN). The terminal may refer to User Equipment (UE), an access terminal, a user unit, a subscriber station, a mobile radio station, a mobile station, a remote station, a remote terminal, mobile equipment, a user terminal, a terminal, wireless communication equipment, a user agent or a user device. The access terminal may be a cellular telephone, a cordless telephone, a Session Initiation Protocol (SIP) telephone, a Wireless Local Loop (WLL) station, a Personal Digital Assistant (PDA), handheld equipment with a wireless communication function, computing equipment, or other processing equipment connected to a wireless modem, vehicle-mounted equipment, wearable equipment, a terminal in a future 5G network and the like.

Various embodiments are described in the disclosure in conjunction with a base station. The base station may be an equipment configured to communicate with the terminal. For example, the base station may be a Base Transceiver Station (BTS) in a GSM or CDMA, or may be a NodeB (NB) in a WCDMA system, or may be an Evolutional Node B (eNB or eNodeB) in an LTE system. Alternatively, the base station may be a relay station, an access point, vehicle-mounted equipment, wearable equipment, network-side equipment in the future 5G network or the like.

At least some embodiments of the present disclosure provide the following solutions.

Solution 1. A data transmission method, comprising:
determining, by a terminal, M time unit or units in an unlicensed carrier which is/are configured for uplink transmission and N time unit or units in the unlicensed carrier which is/are configured for downlink transmission, wherein M is a positive integer, and N is a positive integer;
receiving, by the terminal, downlink data sent by a base station over the N time unit or units; and
sending, by the terminal, feedback information, which is corresponding to the downlink data in the first K time unit or units of the N time unit or units, to the base station over a first time unit of the M time unit or units, wherein K is a positive integer less than or equal to N, the first time unit is after the first K time unit or units, and a difference value between a starting moment of the first time unit and a starting moment of the last time unit of the first K time unit or units is equal to or greater than a system feedback processing latency.

Solution 2. The method according to solution 1, wherein the first time unit is the last time unit of the M time unit or units.

Solution 3. The method according to solution 1, wherein when a length of the M time unit or units is equal to or greater than the feedback processing latency, the first time unit is the last time unit after the feedback processing latency, with the last time unit in the N time unit or units as a reference; and when the length of the M time unit or units is smaller than the feedback processing latency, the first time unit is the last time unit of the M time unit or units.

Solution 4. The method according to any one of solutions 1-3, further comprising:
receiving, by the terminal, indication information at a starting moment of the N time unit or units, the indication information being configured to indicate the N time unit or units which is/are configured for downlink transmission and the M time unit or units which is/are configured for uplink transmission.

Solution 5. The method according to any one of solutions 1-4, wherein the downlink data comprises at least one of broadcast information, a synchronization signal, a reference signal, Downlink Control Information (DCI) and downlink service data.

Solution 6. The method according to solution 5, wherein the DCI comprises scheduling information, and the scheduling information is configured to schedule uplink transmission of the M time unit or units.

Solution 7. The method according to solution 6, wherein the scheduling information sent in each of the cells, which are configured for scheduling uplink transmission, of the N time unit or units is configured to schedule uplink transmission of one of the M time unit or units.

Solution 8. The method according to solution 6, wherein the scheduling information sent in each of the cells, which are configured for scheduling uplink transmission, of the N time unit or units is configured to schedule uplink transmission of more than one of the M time unit or units.

Solution 9. The method according to any one of solutions 1-8, wherein sending, by the terminal, the feedback information, which is corresponding to the downlink data in the first K time unit or units of the N time unit or units, to the base station over a first time unit of the M time unit or units comprises:
generating, by the terminal, cascaded C×K-bit information as the feedback information according to a sequence of the time units, wherein C is a maximum codeword number supported by system downlink transmission; and
sending, by the terminal, the feedback information to the base station over the first time unit.

Solution 10. The method according to any one of solutions solutions 1-9, wherein the time units are subframes or timeslots.

Solution 11. A data transmission method, comprising:
determining, by a base station, M time unit or units in an unlicensed carrier which is/are configured for uplink transmission and N time unit or units in the unlicensed carrier which is/are configured for downlink transmission, wherein M is a positive integer, and N is a positive integer;
sending, by the base station, downlink data to a terminal over the N time unit or units; and
receiving, by the base station, feedback information, which is corresponding to the downlink data in the first K time unit or units of the N time unit or units, from the terminal over a first time unit of the M time unit or units, wherein K is a positive integer less than or equal to N, the first time unit is after the first K time unit or units, and a difference value between a starting moment of the first time unit and a starting moment of the last time unit of the first K time unit or units is equal to or greater than a system feedback processing latency.

Solution 12. The method according to solution 11, wherein the first time unit is the last time unit of the M time unit or units.

Solution 13. The method according to solution 11, wherein
when a length of the M time unit or units is equal to or greater than the feedback processing latency, the first time unit is the last time unit after the feedback processing latency, with the last time unit in the N time unit or units as a reference; and
when the length of the M time unit or units is smaller than the feedback processing latency, the first time unit is the last time unit of the M time unit or units.

Solution 14. The method according to any one of solutions 11-13, further comprising:
sending, by the base station, indication information to the terminal at a starting moment of the N time unit or units, the indication information being configured to indicate the N time unit or units which is/are configured for downlink transmission and the M time unit or units which is/are configured for uplink transmission.

Solution 15. The method according to any one of solutions 11-14, wherein the downlink data comprises at least one of broadcast information, a synchronization signal, a reference signal, Downlink Control Information (DCI) and downlink service data.

Solution 16. The method according to solution 15, wherein the DCI comprises scheduling information, and the scheduling information is configured to schedule uplink transmission of the M time unit or units.

Solution 17. The method according to solution 16, wherein the scheduling information sent in each of the cells, which are configured for scheduling uplink transmission, of the N time unit or units is configured to schedule uplink transmission of one of the M time unit or units.

Solution 18. The method according to solution 16, wherein the scheduling information sent in each of the cells, which are configured for scheduling uplink transmission, of the N time unit or units is configured to schedule uplink transmission of more than one of the M time unit or units.

Solution 19. The method according to any one of solutions 11-18, wherein the feedback information is C×K-bit information cascaded according to a sequence of the time units, wherein C is a maximum codeword number supported by system downlink transmission.

Solution 20. The method according to any one of solutions 11-19, wherein the time units are subframes or timeslots.

Solution 21. The method according to any one of solutions 11-20, further comprising:
configuring, by the base station, a Guard Period (GP) for uplink transmission and downlink transmission.

Solution 22. A terminal, comprising:
a determination module, configured to determine M time unit or units in an unlicensed carrier which is/are configured for uplink transmission and N time unit or units in the unlicensed carrier which is/are configured for downlink transmission, wherein M is a positive integer, and N is a positive integer;
a receiving module, configured to receive downlink data sent by a base station over the N time unit or units determined by the determination module; and
a sending module, configured to send feedback information, which is corresponding to the downlink data in the first K time unit or units of the N time unit or units, to the base station over a first time unit of the M time unit or units determined by the determination module, wherein K is a positive integer less than or equal to N, the first time unit is after the first K time unit or units, and a difference value between a starting moment of the first time unit and a starting moment of the last time unit of the first K time unit or units is equal to or greater than a system feedback processing latency.

Solution 23. The terminal according to solution 22, wherein the first time unit is the last time unit of the M time unit or units.

Solution 24. The terminal according to solution 22, wherein
when a length of the M time unit or units is equal to or greater than the feedback processing latency, the first time unit is the last time unit after the feedback processing latency, with the last time unit in the N time unit or units as a reference; and
when the length of the M time unit or units is smaller than the feedback processing latency, the first time unit is the last time unit of the M time unit or units.

Solution 25. The terminal according to any one of solutions 22-24, wherein the receiving module is further configured to:
receive indication information at a starting moment of the N time unit or units, the indication information being configured to indicate the N time unit or units which is/are configured for downlink transmission and the M time unit or units which is/are configured for uplink transmission.

Solution 26. The terminal according to any one of solutions 22-25, wherein the downlink data comprises at least one of broadcast information, a synchronization signal, a reference signal, Downlink Control Information (DCI) and downlink service data.

Solution 27. The terminal according to solution 26, wherein the DCI comprises scheduling information, and the scheduling information is configured to schedule uplink transmission of the M time unit or units.

Solution 28. The terminal according to solution 27, wherein the scheduling information sent in each of the cells, which are configured for scheduling uplink transmission, of the N time unit or units is configured to schedule uplink transmission of one of the M time unit or units.

Solution 29. The terminal according to solution 27, wherein the scheduling information sent in each of the cells, which are configured for scheduling uplink transmission, of the N time unit or units is configured to schedule uplink transmission of more than one of the M time unit or units.

Solution 30. The terminal according to any one of solutions 22-29, wherein the sending module is specifically configured to:
generate cascaded C×K-bit information as the feedback information according to a sequence of the time units, wherein C is a maximum codeword number supported by system downlink transmission; and
send the feedback information to the base station over the first time unit.

Solution 31. The terminal according to any one of solutions 22-30, wherein the time units are subframes or timeslots.

Solution 32. A base station, comprising:
a determination module, configured to determine M time unit or units in an unlicensed carrier which is/are configured for uplink transmission and N time unit or units in the unlicensed carrier which is/are configured for downlink transmission, wherein M is a positive integer, and N is a positive integer;
a sending module, configured to send downlink data to a terminal over the N time unit or units determined by the determination module; and a receiving module, configured to receive feedback information, which is corresponding to the downlink data in the first K time unit or units of the N time unit or units, from the terminal over a first time unit of the M time unit or units determined by the determination module, wherein K is a positive integer less than or equal to N, the first time unit is after the first K time unit or units, and a difference value between a starting moment of the first time unit and a starting moment of the last time unit of the first K time unit or units is equal to or greater than a system feedback processing latency.

Solution 33. The base station according to solution 32, wherein the first time unit is the last time unit of the M time unit or units.

Solution 34. The base station according to solution 32, wherein when a length of the M time unit or units is equal to or greater than the feedback processing latency, the first time unit is the last time unit after the feedback processing latency, with the last time unit in the N time unit or units as a reference; and when the length of the M time unit or units is smaller than the feedback processing latency, the first time unit is the last time unit of the M time unit or units.

Solution 35. The base station according to any one of solutions 32-34, wherein the sending module is further configured to:

send indication information to the terminal at a starting moment of the N time unit or units, the indication information being configured to indicate the N time unit or units which is/are configured for downlink transmission and the M time unit or units which is/are configured for uplink transmission.

Solution 36. The base station according to any one of solutions 32-35, wherein the downlink data comprises at least one of broadcast information, a synchronization signal, a reference signal, Downlink Control Information (DCI) and downlink service data.

Solution 37. The base station according to solution 36, wherein the DCI comprises scheduling information, and the scheduling information is configured to schedule uplink transmission of the M time unit or units.

Solution 38. The base station according to solution 37, wherein the scheduling information sent in each of the cells, which are configured for scheduling uplink transmission, of the N time unit or units is configured to schedule uplink transmission of one of the M time unit or units.

Solution 39. The base station according to solution 37, wherein the scheduling information sent in each of the cells, which are configured for scheduling uplink transmission, of the N time unit or units is configured to schedule uplink transmission of more than one of the M time unit or units.

Solution 40. The base station according to any one of solutions 32-39, wherein the feedback information is C×K-bit information cascaded according to a sequence of the time units, wherein C is a maximum codeword number supported by system downlink transmission.

Solution 41. The base station according to any one of solutions 32-40, wherein the time units are subframes or timeslots.

Solution 42. The base station according to any one of solutions 32-41, further comprising:

a configuration module, configured to set a Guard Period (GP) for uplink transmission and downlink transmission.

Related technologies and concepts involved in the embodiments of the disclosure will be briefly introduced below.

CA Technology

With development of a communication technology, an LTE-Advanced (LTE-A) technology is evolved from an LTE technology. In an LTE-A Release 10 (R10) system, a CA technology comes into use for bandwidth extension. That is, at most 5 LTE carriers CC1-CC5 illustrated in FIG. 1 may be aggregated to achieve a transmission bandwidth of maximally 100 MHz. According to a capability of a terminal and a volume of data transmitted by it, a base station may configure a number of carriers aggregated for transmission for each terminal. The aggregated carriers may be called as CCs.

For a terminal, multiple aggregated CCs include: (1) a Primary Cell (PCell) and (2) Secondary Cells (SCells). Here, there may be only one PCell. The terminal executes an initial connection establishment process or starts a connection reestablishment process on the PCell. The terminal receives a common search space of a Physical Downlink Control Channel (PDCCH) only over the PCell. And the terminal equipment sends a PUCCH only over the PCell. Here, the other CCs except the PCell are all SCells. The terminal may receive DCI and PDSCHs over the SCells and send PUSCHs over the SCells.

A method, terminal and base station of the embodiments of the disclosure may be applied to a scenario where no licensed carrier is used and an unlicensed carrier is independently used for work (descriptions will be made below with this scenario as an example), and may also be applied to the abovementioned CA scenario, which will not be limited in the embodiments of the disclosure.

Feedback of ACK Information or NACK Information

After establishing a communication connection with a base station, a terminal receives DCI and acquires scheduling information (which may include, for example, contents of locations and number of physical resources, a modulation and coding level and the like) corresponding to a PDSCH. The terminal receives the PDSCH according to the scheduling information, and demodulates and decodes a TB born therein. When a decoding result is correct, the terminal may feed back ACK information to the base station. When the decoding result is incorrect, the terminal may feed back NACK information to the base station, and then the base station retransmits the TB.

The ACK information or the NACK information may be transmitted through a PUSCH or a PUCCH. When the terminal has no PUSCH transmitted in an uplink subframe, the ACK information or NACK transmitted in the subframe may only be transmitted through the PUCCH.

It is to be understood that feedback information mentioned here may include ACK information and/or NACK information.

In a scenario where no licensed carrier is used and an unlicensed carrier is independently used for work, a base station and a terminal work by using M time units in the unlicensed carrier which are configured for uplink transmission and N time units in the unlicensed carrier which are configured for downlink transmission. Here, M may be 1, 2, 3, 4, 5 . . . , and N may be 1, 2, 3, 4, 5 . . . .

It is to be understood that, in the embodiments of the disclosure, the time units may be frames, subframes or timeslots, or may even be symbols, which will not be limited in the embodiments of the disclosure. Preferably, the time units are subframes or timeslots.

As a preferable design, the M time units are successive time units, the N time units are successive time units, the N time units and the M time units are successive time units, and the N time units are before the M time units. Of course, there are no limits made in the embodiments of the disclosure.

In the embodiments of the disclosure, the M time units and the N time units may be predetermined by the base station and the terminal. More preferably, M and N may be determined and notified to the terminal by the base station.

Specifically, after determining that the unlicensed carrier is idle, the base station starts occupying the unlicensed carrier for data transmission. The base station determines that a time length occupied by downlink transmission is the N time units and a time length occupied by uplink transmission is the M time units in transmission of this time according to traffic to be transmitted. The base station may send indication information to the terminal at a starting moment of the N time units. The indication information is configured to indicate the N time units which are configured for downlink transmission and the M time units which are configured for uplink transmission. Correspondingly, the terminal receives the indication information at the starting moment of the N time units.

From the above, the terminal and the base station determine the M time units in the unlicensed carrier which are configured for uplink transmission and the N time units in the unlicensed carrier which are configured for downlink transmission at first in a predetermination manner or a manner of notification by the base station.

Furthermore, the base station sends downlink data to the terminal over the N time units. The downlink data may include at least one of broadcast information, a synchronization signal, a reference signal, DCI and downlink service data.

Figure 2:
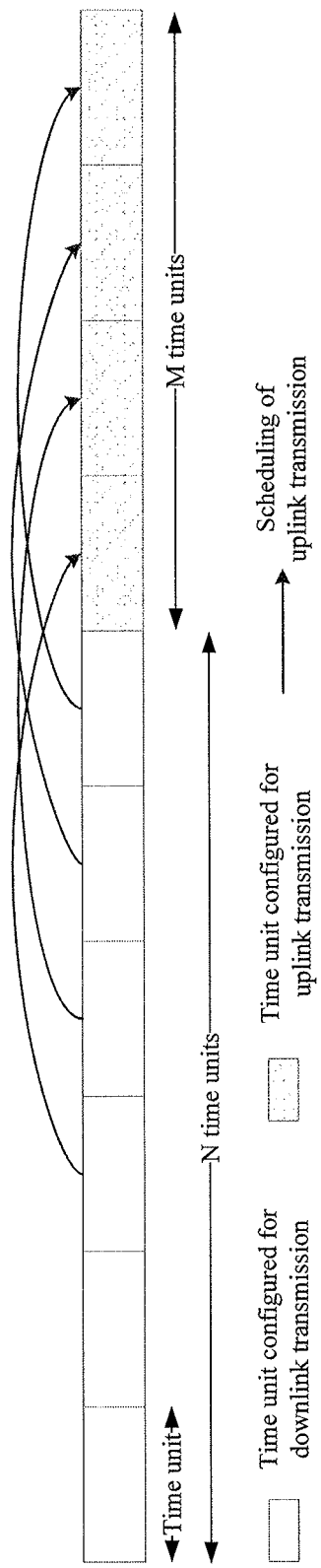
FIG. 2 is a schematic diagram of time units for transmitting feedback information according to an embodiment of the disclosure.

In an embodiment, the DCI may include scheduling information. The scheduling information is configured to schedule uplink transmission of the M time units. Here, the scheduling information sent in each of the cells, which are configured for scheduling uplink transmission, of the N time units is configured to schedule uplink transmission of one of the M time units, as illustrated in FIG. 2. The scheduling information sent in each of the cells, which are configured for scheduling uplink transmission, of the N time units is configured to schedule uplink transmission of more than one of the M time units, as illustrated in FIG. 3.

In other words, the scheduling information sent in a time unit configured for downlink transmission may schedule data transmission in only one time unit configured for uplink transmission, or may schedule data transmission in multiple different time units configured for uplink transmission.

Figure 3:
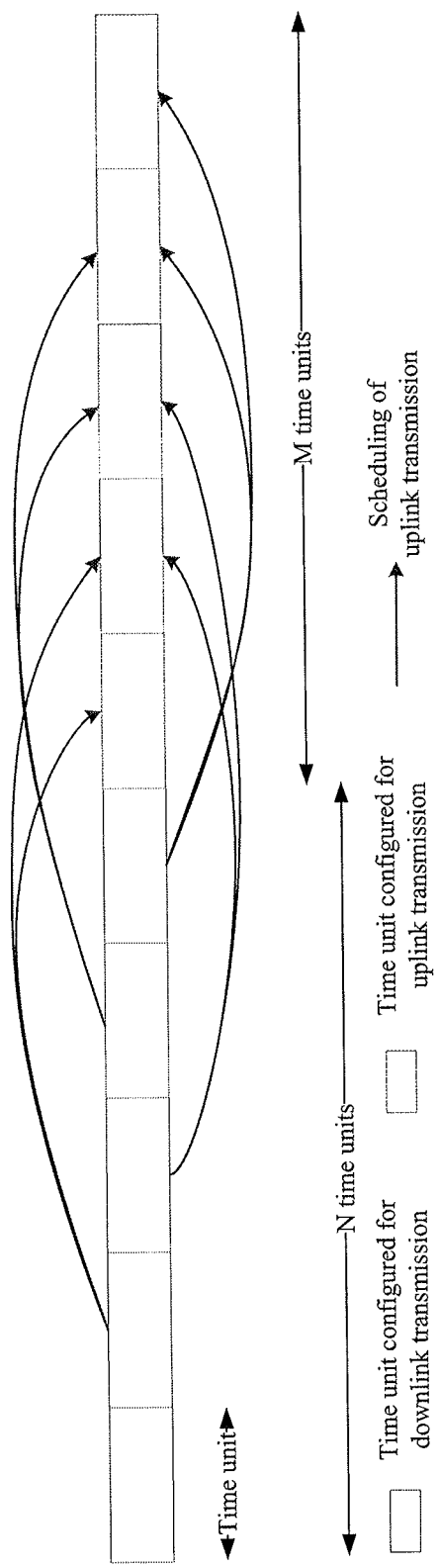
FIG. 3 is a schematic diagram of time units for transmitting feedback information according to another embodiment of the disclosure.

In examples illustrated in FIG. 2 and FIG. 3, descriptions are made with the condition that a scheduling processing latency is a length of 4 time units as an example. In the conventional art, the scheduling processing latency is usually 4 ms. When the time units are subframes, the scheduling processing latency corresponds to 4 time units. Of course, when the scheduling processing latency does not form an integral multiple relationship with a length of time units, a time unit difference number of time units configured for scheduling and scheduled time units should be obtained by dividing the scheduling processing latency by a length of each time unit and rounding up a quotient value.

Furthermore, the terminal sends feedback information, which is corresponding to the downlink data in the first K time units of the N time units, to the base station over a first time unit of the M time units. Here, K is a positive integer less than or equal to N. The first time unit is after the first K time units. The difference value between a starting moment of the first time unit and a starting moment of the last time unit of the first K time units is equal to or greater than a system feedback processing latency. Correspondingly, the base station receives the feedback information, which is corresponding to the downlink data in the first K time units of the N time units, from the terminal over a first time unit of the M time units.

Figure 4:
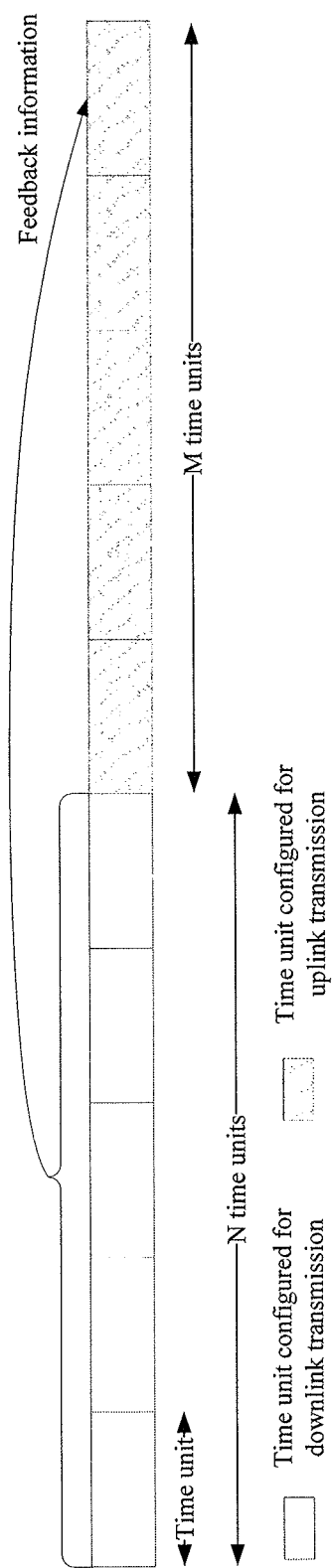
FIG. 4 is a schematic diagram of time units for transmitting feedback information according to another embodiment of the disclosure.
Figure 5:
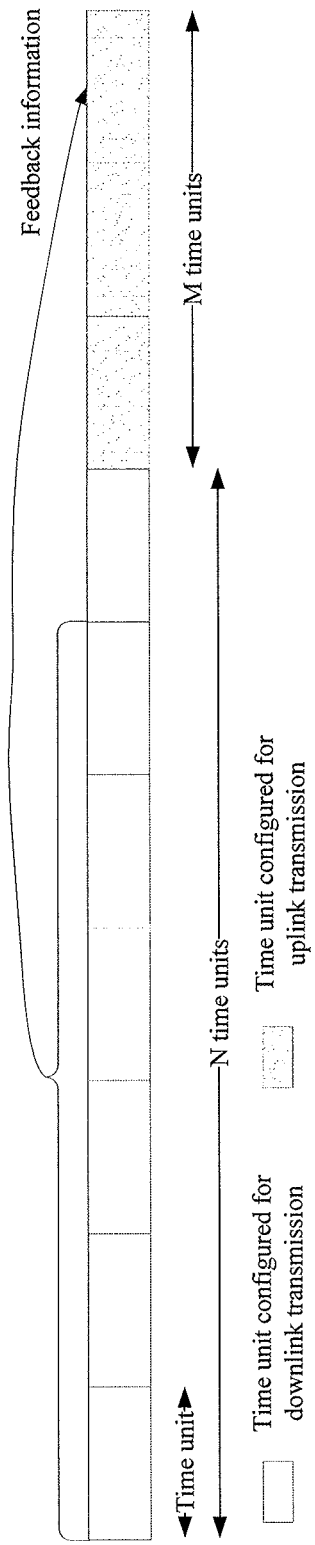
FIG. 5 is a schematic diagram of time units for transmitting feedback information according to another embodiment of the disclosure.

Optionally, as an embodiment, as illustrated in FIG. 4 and FIG. 5, the first time unit may always be the last time unit of the M time units.

Specifically, when a length of the M time units is equal to or greater than the feedback processing latency, K is equal to N.

As illustrated in FIG. 4, M and N are both 5, the first time unit is the last time unit of the M time units, and the terminal may send feedback information corresponding to downlink data in all (five) the time units configured for downlink transmission on the first time unit.

When the length of the M time units is smaller than the feedback processing latency, a time unit difference number of the last time unit of the M time units and the last time unit of the first K time units is obtained by dividing the feedback processing latency by the length of each time length to obtain a quotient value and rounding up the quotient value.

As illustrated in FIG. 5, N is 7, M is 3, the first time unit is the last time unit of the M time units, and the terminal may send feedback information corresponding to downlink data in the first 6 time units configured for downlink transmission over the first time unit. Feedback information corresponding to downlink data in the seventh time unit configured for downlink transmission may be transmitted in another manner, for example, by sending additional signaling or in another scheduling manner, which will not be limited in the embodiment of the disclosure.

Figure 6:
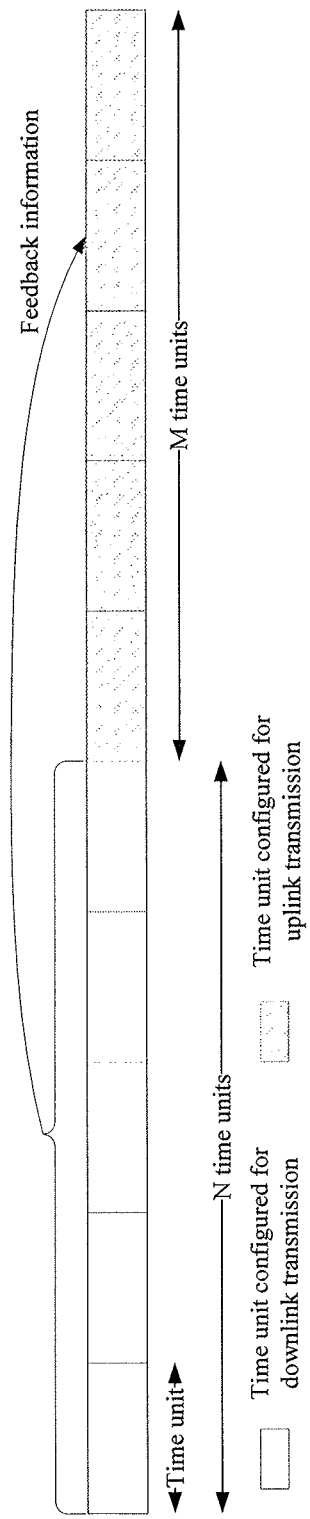
FIG. 6 is a schematic diagram of time units for transmitting feedback information according to another embodiment of the disclosure.

Optionally, as another embodiment, as illustrated in FIG. 6 and FIG. 5, when the length of the M time units is equal to or greater than the feedback processing latency, the first time unit is the first time unit after the feedback processing latency, with the last time unit in the N time units as a reference; and when the length of the M time units is smaller than the feedback processing latency, the first time unit is the last time unit of the M time units.

For the condition that the length of the M time units is equal to or greater than the feedback processing latency, as illustrated in FIG. 6, M and N are both 5, and the first time unit is the fourth time unit in the M time units. Here, the fourth time unit in the M time units is the first time unit after the feedback processing latency, with the last time unit in the N time units as a reference. The terminal may send the feedback information corresponding to the downlink data in all (five) the time units configured for downlink transmission on the first time unit.

For the condition that the length of the M time units is smaller than the feedback processing latency, as illustrated in FIG. 5, N is 7, M is 3, and the first time unit is the last time unit of the M time units. Specific processing is similar to a processing manner of the previous embodiment, and will not be elaborated herein.

It is to be understood that, in the above two embodiments, the descriptions are made with the condition that the feedback processing latency is the length of 4 time units as an example. In the conventional art, the feedback processing latency is usually 4 ms. When the time units are subframes, the feedback processing latency corresponds to 4 time units. Of course, when the feedback processing latency does not form the integral multiple relationship with the length of the time units, the time unit difference number of the first time unit configured for feedback and the last fed back time unit should be obtained by dividing the feedback processing latency by feedback length of each time unit and rounding up feedback quotient value.

In the embodiments of the disclosure, the operation that the terminal sends the feedback information, which is corresponding to the downlink data in the first K time units of the N time units, to the base station over a first time unit of the M time units may include that:

the terminal generates cascaded C×K-bit information as the feedback information according to a sequence of the time units, wherein C is a maximum codeword number supported by system downlink transmission; and the terminal sends the feedback information to the base station over the first time unit.

Figure 7:
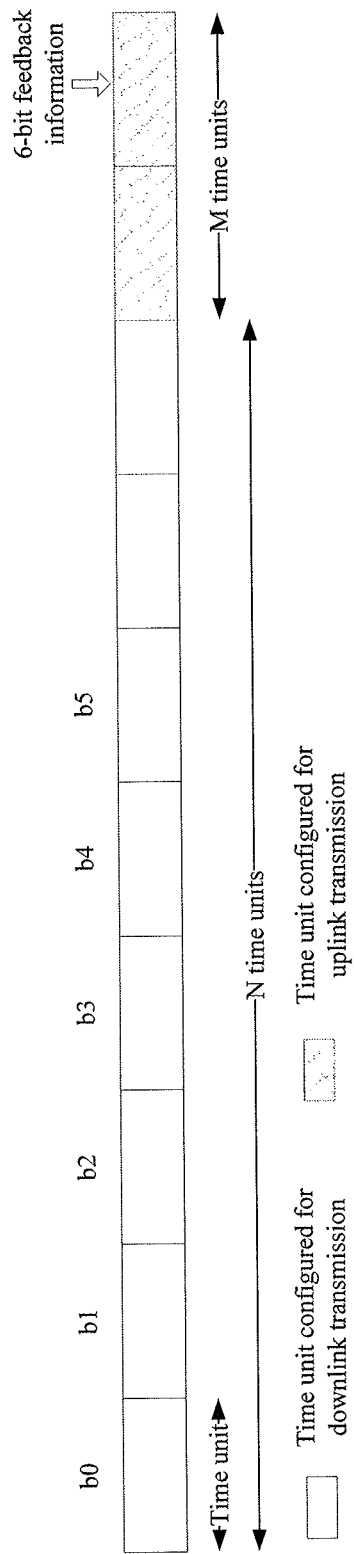
FIG. 7 is a schematic diagram of time units for transmitting feedback information according to another embodiment of the disclosure.
Figure 8:
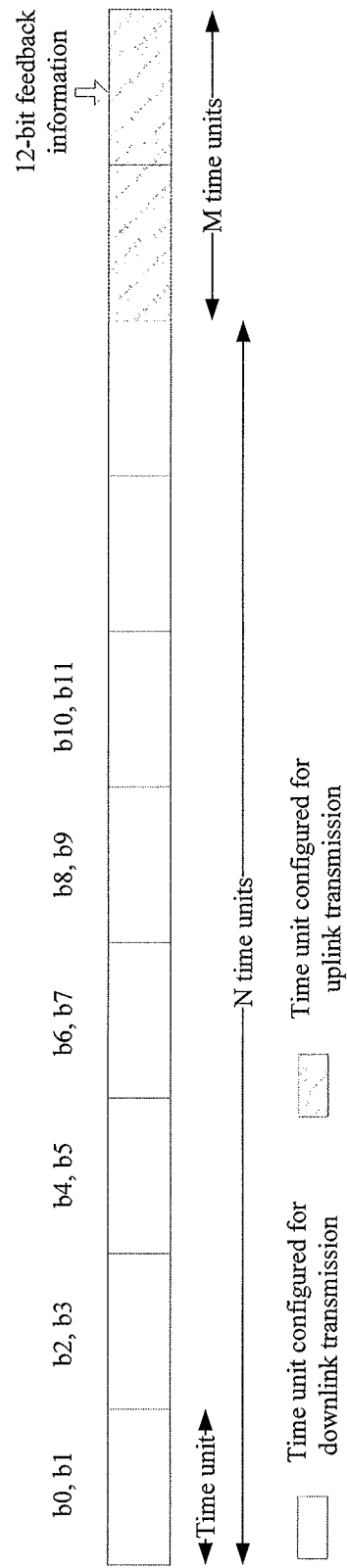
FIG. 8 is a schematic diagram of time units for transmitting feedback information according to another embodiment of the disclosure.

Specifically, the terminal receives the downlink data in the N time units which are configured for downlink transmission, and sends C×K-bit ACK information and/or NACK feedback information to the base station via a first time unit in the M time units which are configured for uplink transmission. In a present LTE system, C is equal to 1 or 2, as illustrated in FIG. 7 (C is equal to 1 and K is equal to 6) and FIG. 8 (C is equal to 2 and K is equal to 6) respectively. Here, a time unit configured for downlink transmission corresponds to C-bit feedback information, and the C×K-bit information is cascaded according to the sequence of the time units.

When the terminal fails to receive any downlink data in a certain time unit configure for downlink transmission, corresponding feedback information of the time unit is set to be NACK. When C=2 and the terminal receives only one codeword in a certain time unit configured for downlink transmission, two configuration solutions may be adopted for ACK/NACK information corresponding to the time unit configured for downlink transmission.

In a first solution, feedback information of the scheduled codeword is set to be ACK or NACK according to a decoding result thereof, and feedback information of an unscheduled codeword is set to be NACK.

In a second solution, the feedback information of the scheduled codeword is set to be ACK or NACK according to the decoding result thereof, and the feedback information of the unscheduled codeword is set to be the same as the feedback information of the scheduled codeword.

In the embodiments of the disclosure, the base station may configure a GP for uplink transmission and downlink transmission. A length of the GP is T ms, and the operation that the base station sends the downlink data to the terminal over the N time units may include the following two solutions.

In a first solution, the base station sends the downlink data to the terminal over the N time units. Here, the last T ms of the last time unit in the N time units is not configured to send the downlink data.

Specifically, the base station autonomously performs control. That is, the base station does not send the downlink data within the last T ms of the last time unit in the N time units which are configured for downlink transmission. The terminal is not required to know about the length of the GP. And the terminal receives the downlink data in a manner as if there is no GP, or performs blind detection on an Enhanced Physical Downlink Control Channel (EPDCCH) and a PDSCH.

In a second solution, the base station sends the downlink data to the terminal over the N time units. The last L symbols of the last time unit in the N time units are not configured to send the downlink data. The length of the L symbols is equal to or greater than T ms. When the length of the L symbols is more than T ms, time, except the last T ms, in the L symbols is configured to send a placeholder.

Specifically, the base station determines that the last L symbols in the last time unit of the N downlink time units configured for downlink transmission are not configured for downlink data transmission, including the PDSCH and the EPDCCH, and a time length of the L symbols is not smaller than T ms. The base station notifies a value of L to the terminal. When the time length of the L symbols is more than T ms, the base station sends the placeholder at a front section in the L symbols, so as to avoid the channel being preempted.

It is to be understood that a specific flow of uplink data transmission of the terminal on the M time units is not described in the embodiments of the disclosure. The uplink transmission flow is similar to an existing flow of uplink transmission in the unlicensed carrier. Uplink data may include uplink service data, uplink control signaling, a sounding signal, a synchronization preamble sequence and the like, and will not be elaborated herein.

According to the data transmission method of the embodiments of the disclosure, a feasible method for transmitting feedback information in a scenario where an unlicensed carrier independently works is provided, so that an application range of the unlicensed carrier is enlarged. Moreover, feedback information corresponding to multiple time units configured for downlink transmission is sent via a time unit configured for uplink transmission, so that feedback efficiency may be improved.

A complete flow of the embodiments of the disclosure has been described above. The data transmission method of the embodiments of the disclosure will be described below from the point of the terminal and the base station respectively.

Figure 9:
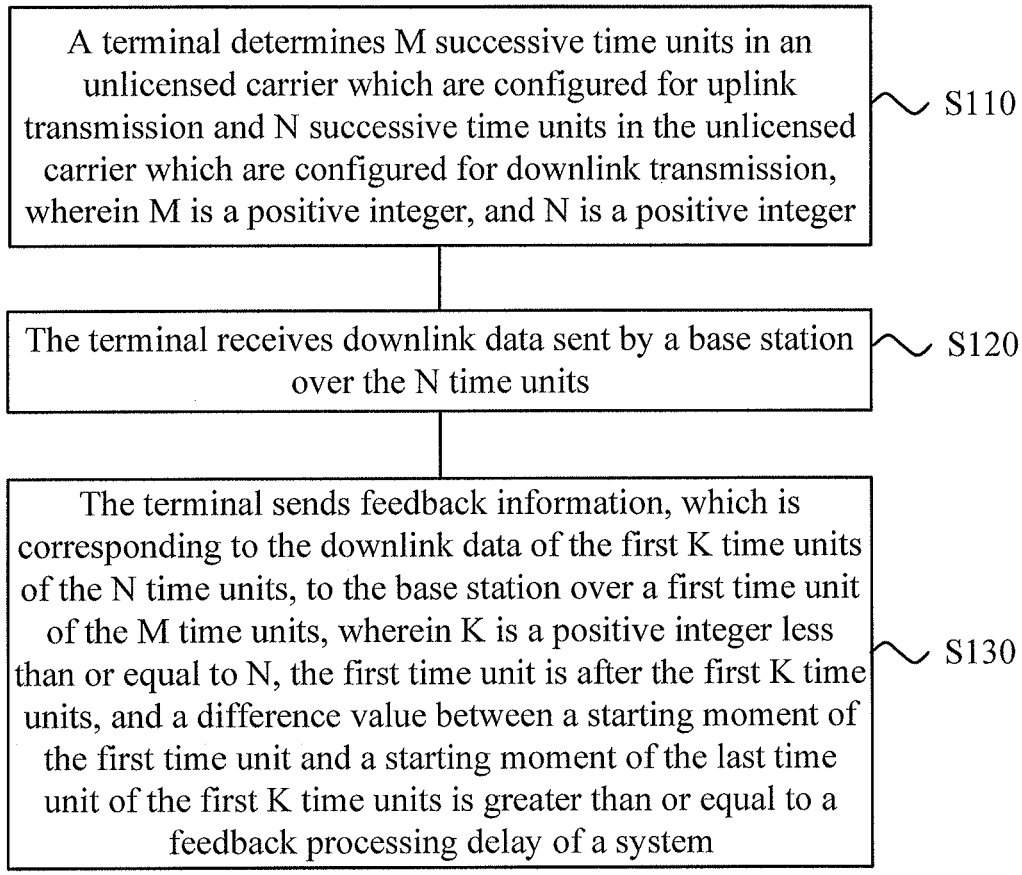
FIG. 9 is a schematic flowchart of a data transmission method according to an embodiment of the disclosure.

FIG. 9 shows a data transmission method 100 according to an embodiment of the disclosure. The method 100 is executed by a terminal, and includes the following operations.

In S110, the terminal determines M time units in an unlicensed carrier which are configured for uplink transmission and N time units in the unlicensed carrier which are configured for downlink transmission. Here, M is a positive integer, and N is a positive integer.

In S120, the terminal receives downlink data sent by a base station over the N time units.

In S130, the terminal sends feedback information, which is corresponding to the downlink data in the first K time units of the N time units, to the base station over a first time unit of the M time units. Here, K is a positive integer less than or equal to N. The first time unit is after the first K time units. The difference value between a starting moment of the first time unit and a starting moment of the last time unit of the first K time units is equal to or greater than a system feedback processing latency.

According to the data transmission method of the embodiment of the disclosure, a feasible method for transmitting feedback information in a scenario where an unlicensed carrier independently works is provided. Moreover, feedback information corresponding to multiple time units configured for downlink transmission is sent via a time unit configured for uplink transmission, so that feedback efficiency may be improved.

Optionally, as an embodiment, before S110, the method 100 may further include that:

the terminal receives indication information at a starting moment of the N time units. The indication information is configured to indicate the N time units which are configured for downlink transmission and the M time units which are configured for uplink transmission.

Optionally, as an embodiment, the operation that the terminal sends the feedback information, which is corresponding to the downlink data in the first K time units of the N time units, over a first time unit of the M time units in S130 may include that:

the terminal generates cascaded C×K-bit information as the feedback information according to a sequence of the time units, wherein C is a maximum codeword number supported by system downlink transmission; and the terminal sends the feedback information to the base station over the first time unit.

Figure 10:
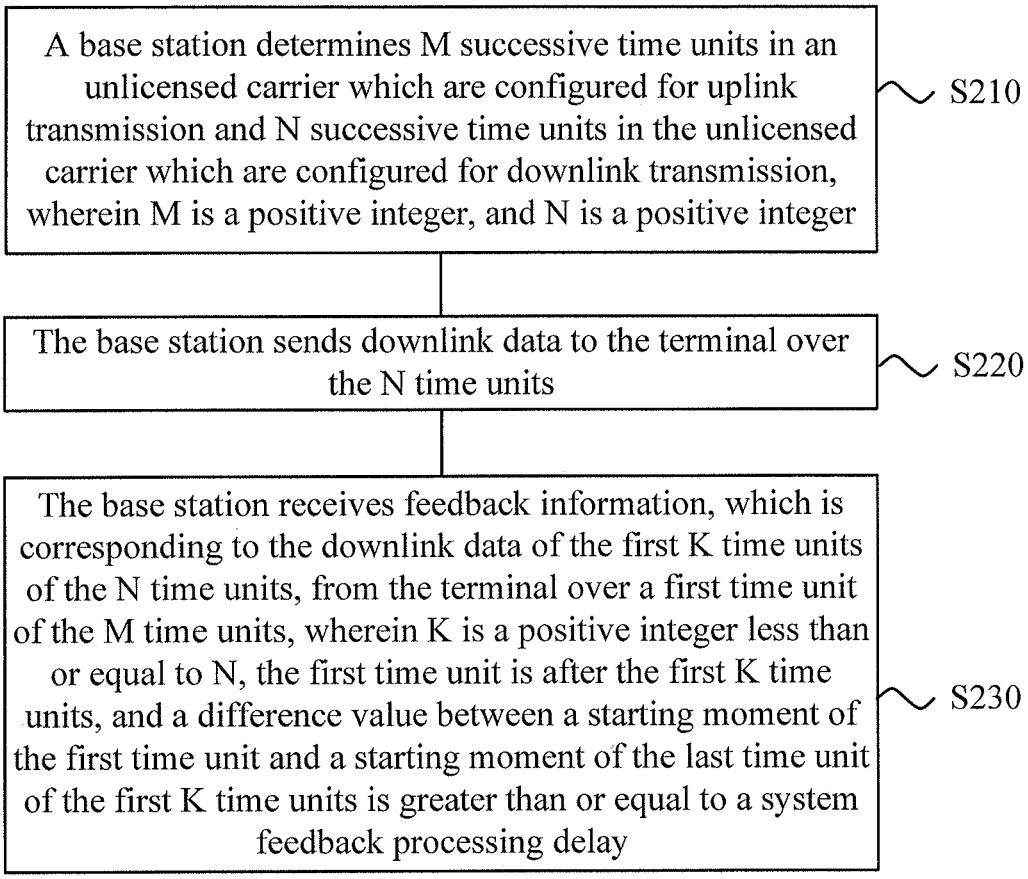
FIG. 10 is a schematic flowchart of a data transmission method according to another embodiment of the disclosure.

FIG. 10 shows a data transmission method 200 according to another embodiment of the disclosure. The method 200 is executed by a base station, and includes the following operations.

In S210, the base station determines M time units in an unlicensed carrier which are configured for uplink transmission and N time units in the unlicensed carrier which are configured for downlink transmission. Here, M is a positive integer, and N is a positive integer.

In S220, the base station sends downlink data to a terminal over the N time units.

In S230, the base station receives feedback information, which is corresponding to the downlink data in the first K time units of the N time units, from the terminal over a first time unit of the M time units. Here, K is a positive integer less than or equal to N, the first time unit is after the first K time units, and a difference value between a starting moment of the first time unit and a starting moment of the last time unit of the first K time units is equal to or greater than a system feedback processing latency.

According to the data transmission method of the embodiment of the disclosure, a feasible method for transmitting feedback information in a scenario where an unlicensed carrier independently works is provided. Moreover, feedback information corresponding to multiple time units configured for downlink transmission is sent via a time unit configured for uplink transmission, so that feedback efficiency may be improved.

Optionally, as an embodiment, after S210, the method 200 may further include that:

the base station sends indication information to the terminal at a starting moment of the N time units, the indication information being configured to indicate the N time units which are configured for downlink transmission and the M time units which are configured for uplink transmission.

Optionally, as an embodiment, the feedback information is C×K-bit information cascaded according to a sequence of the time units, wherein C is a maximum codeword number supported by system downlink transmission.

Optionally, as an embodiment, the method 200 may further include that:

the base station configures a GP for uplink transmission and downlink transmission.

Optionally, a length of the GP is T ms, and the operation that the base station sends the downlink data to the terminal on the N time units includes that:

the base station sends the downlink data to the terminal on the N time units, wherein last T ms of the last time unit in the N time units is not configured to send the downlink data;

or the base station sends the downlink data to the terminal on the N time units, last L symbols of the last time unit in the N time units are not configured to send the downlink data, a length of the L symbols is equal to or greater than T ms, when the length of the L symbols is more than T ms, time, except the last T ms, in the L symbols is configured to send a placeholder, and the base station notifies a value of L to the terminal.

It is to be understood that, in each embodiment of the disclosure, a magnitude of a sequence number of each process does not mean an execution sequence, the execution sequence of each process should be determined according to its function and an internal logic, and an implementation process of the embodiment of the disclosure should not be limited.

The data transmission method of the embodiments of the disclosure is described above in detail, and data transmission terminal equipment and base station of the embodiments of the disclosure will be described below.

Figure 11:
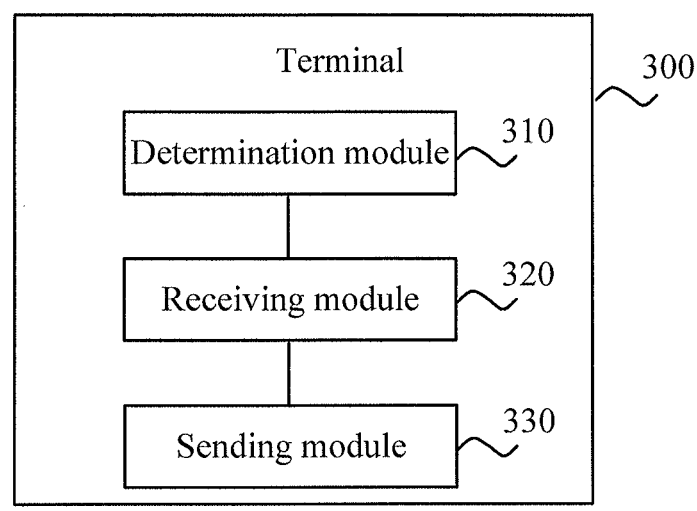
FIG. 11 is a schematic block diagram of a terminal according to an embodiment of the disclosure.

FIG. 11 shows a terminal 300 according to an embodiment of the disclosure. The terminal 300 includes a determination module 310, a receiving module 320 and a sending module 330.

The determination module 310 is configured to determine M time units in an unlicensed carrier which are configured for uplink transmission and N time units in the unlicensed carrier which are configured for downlink transmission. Here, M is a positive integer, and N is a positive integer.

The receiving module 320 is configured to receive downlink data sent by a base station over the N time units determined by the determination module 310.

The sending module 330 is configured to send feedback information, which is corresponding to the downlink data in the first K time units of the N time units, to the base station over a first time unit of the M time units determined by the determination module 310. Here, K is a positive integer less than or equal to N. The first time unit is after the first K time units. The difference value between a starting moment of the first time unit and a starting moment of the last time unit of the first K time units is equal to or greater than a system feedback processing latency.

Optionally, as an embodiment, the receiving module 320 may further be configured to:

receive indication information at a starting moment of the N time units, the indication information being configured to indicate the N time units which are configured for downlink transmission and the M time units which are configured for uplink transmission.

Optionally, as an embodiment, the sending module 330 may specifically be configured to:

generate cascaded C×K-bit information as the feedback information according to a sequence of the time units, wherein C is a maximum codeword number supported by system downlink transmission; and send the feedback information to the base station over the first time unit.

Figure 12:
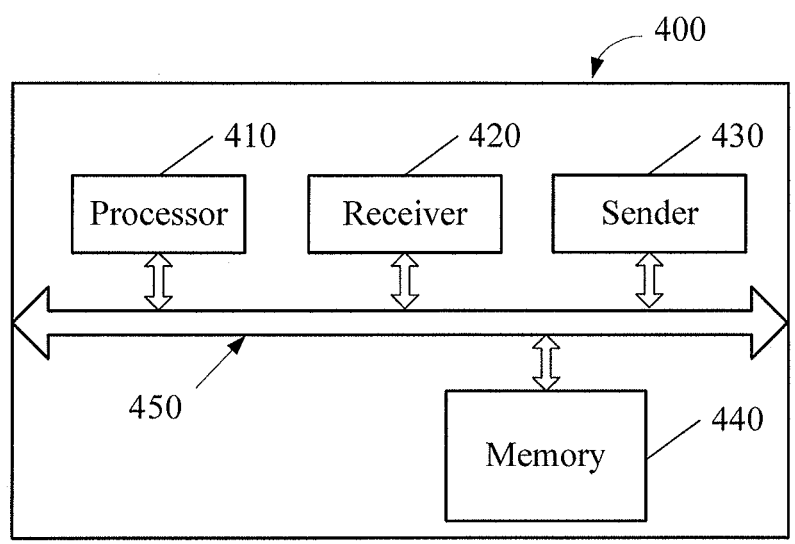
FIG. 12 is a schematic block diagram of a terminal according to another embodiment of the disclosure.

It is to be noted that, in the embodiment of the disclosure, the receiving module 320 may be implemented by a receiver, the sending module 330 may be implemented by a sender, and the determination module 310 may be implemented by a processor. As illustrated in FIG. 12, a terminal 400 may include a processor 410, a receiver 420, a sender 430 and a memory 440. Here, the memory 440 may be configured to store codes executed by the processor 410 and the like.

Each component in the terminal 400 is together through a bus system 450. Here, the bus system 450 includes a data bus, and further includes a power bus, a control bus and a state signal bus.

The terminal 300 illustrated in FIG. 11 or the terminal 400 illustrated in FIG. 12 may implement various processes implemented in the embodiments illustrated in FIG. 1 to FIG. 10, which will not be elaborated herein to avoid repetition.

It is to be noted that the method embodiments of the disclosure may be applied to a processor or implemented by the processor. The processor may be an integrated circuit chip with a signal processing capability. In an implementation process, each step of the method embodiments may be completed by an integrated logical circuit of hardware in the processor or an instruction in a software form. The processor may be a universal processor, a Digital Signal Processor (DSP), an Application Specific Integrated Circuit (ASIC), a Field Programmable Gate Array (FPGA) or another programmable logical device, discrete gate or transistor logical device and discrete hardware component. Each method, step and logical block diagram disclosed in the embodiments of the disclosure may be implemented or executed. The universal processor may be a microprocessor or the processor may also be any conventional processor and the like. The steps of the methods disclosed in conjunction with the embodiments of the disclosure may be directly embodied to be executed and completed by a hardware decoding processor or executed and completed by a combination of hardware and software modules in the decoding processor. The software module may be located in a mature storage medium in this field such as a Random Access Memory (RAM), a flash memory, a Read-Only Memory (ROM), a Programmable ROM (PROM) or Electrically Erasable PROM (EEPROM) and a register. The storage medium is located in a memory, and the processor reads information in the memory, and completes the steps of the methods in conjunction with hardware.

It can be understood that the memory in the embodiment of the disclosure may be a volatile memory or a nonvolatile memory, or may include both the volatile and nonvolatile memories, wherein the nonvolatile memory may be a ROM, a PROM, an Erasable PROM (EPROM), an EEPROM or a flash memory. The volatile memory may be a RAM, and is used as an external high-speed cache. It is exemplarily but unlimitedly described that RAMs in various forms may be adopted, such as a Static RAM (SRAM), a Dynamic RAM (DRAM), a Synchronous DRAM (SDRAM), a Double Data Rate SDRAM (DDRSDRAM), an Enhanced SDRAM (ESDRAM), a Synchlink DRAM (SLDRAM) and a Direct Rambus RAM (DR RAM). It is to be noted that the memory of a system and method described in the disclosure is intended to include, but not limited to, memories of these and any other proper types.

Figure 13:
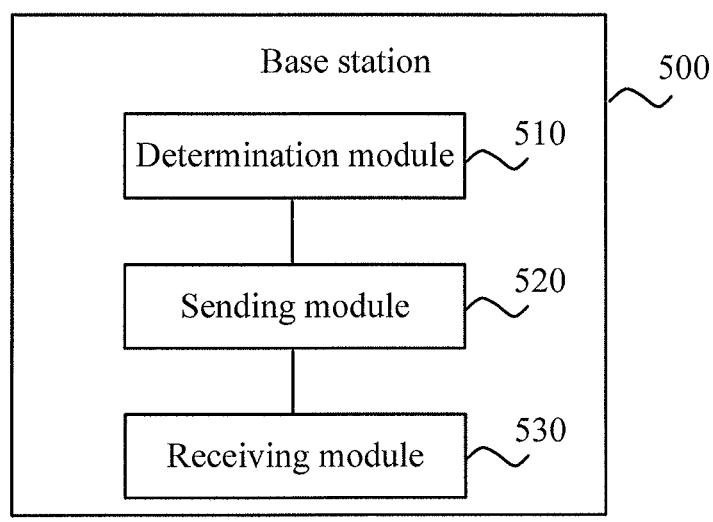
FIG. 13 is a schematic block diagram of a base station according to an embodiment of the disclosure.

FIG. 13 shows a base station 500 according to an embodiment of the disclosure. The base station 500 includes a determination module 510, a sending module 520 and a receiving module 530.

The determination module 510 is configured to determine M time units in an unlicensed carrier which are configured for uplink transmission and N time units in the unlicensed carrier which are configured for downlink transmission. Here, M is a positive integer, and N is a positive integer.

The sending module 520 is configured to send downlink data to a terminal over the N time units determined by the determination module 510.

The receiving module 530 is configured to receive feedback information, which is corresponding to the downlink data in the first K time units of the N time units, from the terminal over a first time unit of the M time units determined by the determination module 510. Here, K is a positive integer less than or equal to N. The first time unit is after the first K time units. The difference value between a starting moment of the first time unit and a starting moment of the last time unit of the first K time units is equal to or greater than a system feedback processing latency.

Optionally, as an embodiment, the sending module 520 may further be configured to:

send indication information to the terminal at a starting moment of the N time units, the indication information being configured to indicate the N time units which are configured for downlink transmission and the M time units which are configured for uplink transmission.

Optionally, as an embodiment, the feedback information is C×K-bit information cascaded according to a sequence of the time units, wherein C is a maximum codeword number supported by system downlink transmission.

Optionally, as an embodiment, the base station 500 may further include a configuration module.

The configuration module is configured to set a GP for uplink transmission and downlink transmission.

Figure 14:
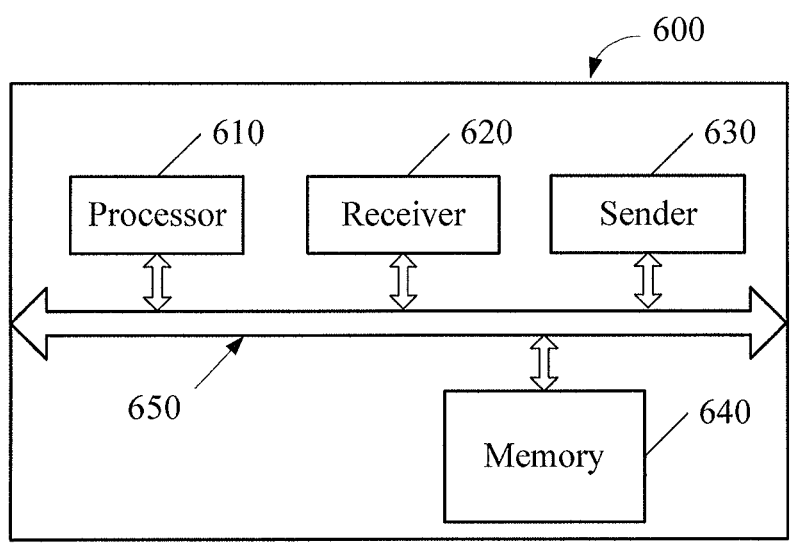
FIG. 14 is a schematic block diagram of a base station according to another embodiment of the disclosure.

It is to be noted that, in the embodiment of the disclosure, the receiving module 530 may be implemented by a receiver, the sending module 520 may be implemented by a sender, and the determination module 510 may be implemented by a processor. As illustrated in FIG. 14, a terminal 600 may include a processor 610, a receiver 620, a sender 630 and a memory 640. Here, the memory 640 may be configured to store codes executed by the processor 610 and the like.

Each component in the terminal 600 is together through a bus system 650. Here, the bus system 650 includes a data bus, and further includes a power bus, a control bus and a state signal bus.

The terminal 500 illustrated in FIG. 13 or the terminal 600 illustrated in FIG. 14 may implement various processes implemented in the embodiments illustrated in FIG. 1 to FIG. 10, which will not be elaborated herein to avoid repetition.

Optionally, in various methods, terminals and base stations of the embodiments of the disclosure, as an embodiment, the first time unit is the last time unit of the M time units.

Optionally, in various methods, terminals and base stations of the embodiments of the disclosure, as another embodiment, when a length of the M time units is equal to or greater than the feedback processing latency, the first time unit is the first time unit after the feedback processing latency, with the last time unit in the N time units as a reference; and when the length of the M time units is smaller than the feedback processing latency, the first time unit is the last time unit of the M time units.

Optionally, in various methods, terminals and base stations of the embodiments of the disclosure, the downlink data includes at least one of broadcast information, a synchronization signal, a reference signal, DCI and downlink service data.

Optionally, in various methods, terminals and base stations of the embodiments of the disclosure, the DCI includes scheduling information, and the scheduling information is configured to scheduling uplink transmission of the M time units.

Optionally, in various methods, terminals and base stations of the embodiments of the disclosure, the scheduling information sent in each of the cells, which are configured for scheduling uplink transmission, of the N time units is configured to schedule uplink transmission of one of the M time units.

Optionally, in various methods, terminals and base stations of the embodiments of the disclosure, the scheduling information sent in each of the cells, which are configured for scheduling uplink transmission, of the N time units is configured to schedule uplink transmission of more than one of the M time units.

Optionally, in various methods, terminals and base stations of the embodiments of the disclosure, the time units are subframes or timeslots.

Those skilled in the art may understand that the units and algorithm steps of each example described in conjunction with the embodiments disclosed in the disclosure may be implemented by electronic hardware or a combination of computer software and the electronic hardware. Whether these functions are executed in a hardware or software manner depends on specific applications and design constraints of the technical solution. Those skilled in the art may realize the described functions for each specific application by virtue of different methods, but such realization shall fall within the scope of the disclosure.

Those skilled in the art may clearly understand that specific working processes of the system, device and unit described above may refer to the corresponding processes in the method embodiment for convenient and brief description and will not be elaborated herein.

In some embodiments provided by the disclosure, it is to be understood that the disclosed system, device and method may be implemented in another manner. The device embodiment described above is only schematic, and for example, division of the units is only logic function division, and other division manners may be adopted during practical implementation. For example, multiple units or components may be combined or integrated into another system, or some characteristics may be neglected or not executed. In addition, coupling or direct coupling or communication connection between each displayed or discussed component may be indirect coupling or communication connection, implemented through some interfaces, of the device or the units, and may be electrical and mechanical or adopt other forms.

The units described as separate parts may or may not be physically separated, and parts displayed as units may or may not be physical units, and namely may be located in the same place, or may also be distributed to multiple network units. Part or all of the units may be selected to achieve the purpose of the solutions of the embodiments according to a practical requirement.

In addition, each function unit in each embodiment of the disclosure may be integrated into a processing unit, each unit may also exist independently, and two or more than two unit may also be integrated into a unit.

When being implemented in form of software function unit and sold or used as an independent product, the function may also be stored in a computer-readable storage medium. Based on such an understanding, the technical solutions of the disclosure substantially or parts making contributions to a conventional art may be embodied in form of software product, and the computer software product is stored in a storage medium, including a plurality of instructions configured to enable a piece of computer equipment (which may be a personal computer, a server, network equipment or the like) to execute all or part of the steps of the method in each embodiment of the disclosure. The abovementioned storage medium includes: various media capable of storing program codes such as a U disk, a mobile hard disk, a ROM, a RAM, a magnetic disk or an optical disk.

The above is only the specific implementation of the disclosure and not intended to limit the scope of protection of the disclosure. Any variations or replacements apparent to those skilled in the art within the technical scope disclosed by the disclosure shall fall within the scope of protection of the disclosure. Therefore, the scope of protection of the disclosure shall be subject to the scope of protection of the claims.

The invention claimed is:

1. A data transmission method, comprising:
   determining, by a terminal, M time units in an unlicensed carrier which are configured for uplink transmission and N time units in the unlicensed carrier which are configured for downlink transmission, wherein M is a positive integer, and N is a positive integer, and the time units are slots;
   receiving, by the terminal, downlink data sent by a base station over the N time units, wherein the downlink data comprises downlink service data; and
   sending, by the terminal, all feedback information, which is corresponding to the downlink data of the N time units, to the base station over a first time unit of the M time units, wherein the first time unit is after the N time units, and a difference value between a starting moment of the first time unit and a starting moment of the last time unit of the N time units is equal to or greater than a system feedback processing latency;
   wherein the first time unit is a first one of time units after the feedback processing latency, with the last time unit in the N time units as a reference.

2. The method according to claim 1, wherein the first time unit is the last time unit of the M time units.

3. The method according to claim 1, further comprising:
   receiving, by the terminal, indication information at a starting moment of the N time units, the indication information being configured to indicate the N time units which are configured for downlink transmission and the M time units which are configured for uplink transmission.

4. The method according to claim 1, wherein the downlink data further comprises at least one of broadcast information, a synchronization signal, a reference signal, and Downlink Control Information (DCI).

5. The method according to claim 4, wherein the DCI comprises scheduling information, and the scheduling information is configured to schedule uplink transmission of the M time units.

6. The method according to claim 5, wherein the scheduling information sent in each of the cells, which are configured for scheduling uplink transmission, of the N time units is configured to schedule uplink transmission of one of the M time units.

7. The method according to claim 5, wherein the scheduling information sent in each of the cells, which are configured for scheduling uplink transmission, of the N time units is configured to schedule uplink transmission of more than one of the M time units.

8. The method according to claim 1, wherein sending, by the terminal, the feedback information, which is corresponding to the downlink data of the N time units, to the base station over a first time unit of the M time units comprises:
   generating, by the terminal, cascaded C×K-bit information as the feedback information according to a sequence of the time time units, wherein C is a maximum codeword number supported by system downlink transmission; and
   sending, by the terminal, the feedback information to the base station over the first time unit.

9. The method according to claim 1, wherein N is a positive integer greater than or equal to 2.

10. A data transmission method, comprising:
   determining, by a base station, M time units in an unlicensed carrier which are configured for uplink transmission and N time units in the unlicensed carrier which are configured for downlink transmission, wherein M is a positive integer, and N is a positive integer, and the time units are slots;
   sending, by the base station, downlink data to a terminal over the N time units, wherein the downlink data comprises downlink service data; and
   receiving, by the base station, all feedback information, which is corresponding to the downlink data of the N time units, from the terminal over a first time unit of the M time units, wherein the first time unit is after the N time units, and a difference value between a starting moment of the first time unit and a starting moment of the last time unit of the N time units is equal to or greater than a system feedback processing latency;
   wherein the first time unit is a first one of time units after the feedback processing latency, with the last time unit in the N time units as a reference.

11. The method according to claim 10, wherein the first time unit is the last time unit of the M time units.

12. The method according to claim 10, further comprising:
   sending, by the base station, indication information to the terminal at a starting moment of the N time units, the indication information being configured to indicate the N time units which are configured for downlink transmission and the M time units which are configured for uplink transmission.

13. The method according to claim 10, wherein the downlink data further comprises at least one of broadcast information, a synchronization signal, a reference signal, and Downlink Control Information (DCI).

14. The method according to claim 13, wherein the DCI comprises scheduling information, and the scheduling information is configured to schedule uplink transmission of the M time units.

15. The method according to claim 14, wherein the scheduling information sent in each of the cells, which are configured for scheduling uplink transmission, of the N time units is configured to schedule uplink transmission of one of the M time units.

16. The method according to claim 14, wherein the scheduling information sent in each of the cells, which are configured for scheduling uplink transmission, of the N time units is configured to schedule uplink transmission of more than one of the M time units.

17. The method according to claim 10, further comprising:
   configuring, by the base station, a Guard Period (GP) for uplink transmission and downlink transmission.

18. A terminal, comprising:
   a processor, configured to determine M time units in an unlicensed carrier which are configured for uplink transmission and N time units in the unlicensed carrier which are configured for downlink transmission, wherein M is a positive integer, and N is a positive integer, and the time units are slots;
   a receiver, configured to receive downlink data sent by a base station over the N time units determined by the processor, wherein the downlink data comprises downlink service data; and
   a sender, configured to send all feedback information, which is corresponding to the downlink data of the N time units, to the base station over a first time unit of the M time units determined by the processor, wherein the first time unit is after the N time units, and a difference value between a starting moment of the first time unit and a starting moment of the last time unit of the N time units is equal to or greater than a system feedback processing latency;
   wherein the first time unit is a first one of time units after the feedback processing latency, with the last time unit in the N time units as a reference.

19. The terminal according to claim 18, wherein N is a positive integer greater than or equal to 2.

* * * * *